US008054970B2

(12) United States Patent
Kimura

(10) Patent No.: US 8,054,970 B2
(45) Date of Patent: Nov. 8, 2011

(54) IMAGE FORMING APPARATUS, IMAGE FORMING METHOD, INFORMATION PROCESSING APPARATUS AND INFORMATION PROCESSING METHOD

(75) Inventor: Yoshio Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 899 days.

(21) Appl. No.: 11/628,204

(22) PCT Filed: Jul. 14, 2005

(86) PCT No.: PCT/JP2005/013442
§ 371 (c)(1),
(2), (4) Date: Dec. 1, 2006

(87) PCT Pub. No.: WO2006/009238
PCT Pub. Date: Jan. 26, 2006

(65) Prior Publication Data
US 2008/0267402 A1  Oct. 30, 2008

(30) Foreign Application Priority Data

Jul. 22, 2004 (JP) ................................. 2004-214615

(51) Int. Cl.
*H04N 1/44* (2006.01)
(52) U.S. Cl. .......................................... 380/243; 380/55
(58) Field of Classification Search .................... 380/55, 380/243
See application file for complete search history.

(56) References Cited

U.S. PATENT DOCUMENTS

| 6,047,103 A * | 4/2000 | Yamauchi et al. ............... 386/94 |
| 6,151,675 A | 11/2000 | Smith ............................ 713/153 |
| 6,438,574 B1 | 8/2002 | Nagashima ..................... 709/102 |
| 6,446,051 B1 * | 9/2002 | Gupta .............................. 705/52 |
| 6,470,086 B1 * | 10/2002 | Smith ............................. 380/255 |
| 6,516,411 B2 | 2/2003 | Smith ............................. 713/153 |
| 6,748,529 B2 | 6/2004 | Smith ............................. 713/153 |
| 6,885,748 B1 | 4/2005 | Wang .............................. 380/201 |
| 7,003,667 B1 | 2/2006 | Slick et al. ..................... 713/182 |
| 7,305,556 B2 | 12/2007 | Slick |
| 2002/0042876 A1* | 4/2002 | Smith ............................. 713/153 |
| 2003/0044009 A1* | 3/2003 | Dathathraya ................... 380/55 |
| 2003/0105963 A1* | 6/2003 | Slick et al. ..................... 713/171 |
| 2004/0036917 A1* | 2/2004 | Sano ............................. 358/1.18 |
| 2005/0078825 A1* | 4/2005 | Ohmori et al. ................ 380/255 |
| 2005/0081047 A1* | 4/2005 | Kitani ........................... 713/193 |
| 2005/0084113 A1* | 4/2005 | Simpson et al. .............. 380/270 |
| 2005/0144136 A1* | 6/2005 | Murashita ....................... 705/51 |
| 2006/0279773 A1 | 12/2006 | Sakurai et al. |
| 2007/0171458 A1 | 7/2007 | Kimura |

FOREIGN PATENT DOCUMENTS

CA  2338332 A1  2/2000

(Continued)

*Primary Examiner* — Edan Orgad
*Assistant Examiner* — Bradley Holder
(74) *Attorney, Agent, or Firm* — Fitzpatrick, Cella, Harper & Scinto

(57) ABSTRACT

In an image forming method of receiving encrypted data generated by an information processing apparatus, decrypting the encrypted data into data to be printed, and causing an image forming apparatus to execute printing processing, print data is acquired by decrypting the received encrypted data, and the acquired print data is converted into image data for which the printing processing can be performed. The image data is encrypted with first key information.

6 Claims, 6 Drawing Sheets

FOREIGN PATENT DOCUMENTS

| | | |
|---|---|---|
| CA | 2341806 A1 | 9/2001 |
| CN | 1423206 | 6/2003 |
| EP | 1146714 A1 | 10/2001 |
| JP | 9-134264 | 5/1997 |
| JP | 11-150559 | 6/1999 |
| JP | 11-212744 | 8/1999 |
| JP | 2001-186358 | 7/2001 |
| JP | 2002-077137 | 3/2002 |
| JP | 2002-521879 | 7/2002 |
| JP | 2002-521893 | 7/2002 |
| WO | 00/04718 | 1/2000 |
| WO | WO 00/05642 | 2/2000 |

* cited by examiner

IMAGE FORMING APPARATUS, IMAGE FORMING METHOD, INFORMATION PROCESSING APPARATUS AND INFORMATION PROCESSING METHOD

BACKGROUND OF THE INVENTION

1. Technical Field

The present invention relates to an image forming technique and information processing technique which can speed up the processing from the decryption of print data at the start of printing to the execution of printing while ensuring confidentiality on a network and the confidentiality of print data in an image forming apparatus which processes the data by encrypting the print data.

2. Background Art

Recently, printing systems in which printing apparatuses are shared through networks or the like have increased in number. When a plurality of users use a printing apparatus through a network or the like, the users who have input print jobs are distant from the printing apparatus at the start of printing in many cases. The printed output data may be exposed to a third party. That is, confidentiality cannot be maintained.

As a printing apparatus for which measures are taken to prevent printed output data from being exposed to a third party, an apparatus has been proposed, in which a client computer generates a print job with a personal identification number or password in accordance with, for example, an operation performed by the user who has input the print job, and a printing apparatus executes the print job. Upon receiving the print job with the personal identification number or password from the client computer, the printing apparatus temporarily stores the print job in a storage medium such as a memory or hard disk in the apparatus. When the user who has input the print job walks to the printing apparatus afterward and inputs a personal identification number or password through the operation panel of the printing apparatus, the input personal identification number or password is collated with that of the print job. If the printing apparatus determines in accordance with the collation result that the correct password or the like has been input, the printing apparatus starts executing the stored print job. In this case, since printing is started after the user who has input the print job walks to the printing apparatus, there is no chance that the printed output data of the user will be exposed to a third party (see, for example, Japanese Patent Laid-Open No. 11-212744).

In addition, in order to start printing in front of the printing apparatus, the user must specify a target print job. In general, a print job list is displayed on the display screen of the operation panel of the printing apparatus to let the user select a target print job, and the user inputs a password or the like to make the printing apparatus start printing. Instead of using this method, i.e., letting the user select a print job and input a password or the like, a method using an ID card to improve the convenience of the user has been proposed. In this method, ID information registered in an ID card is used as a personal identification number or password. When this ID card is inserted into the printing apparatus, the printing apparatus reads out the ID information, and finds out a print job with a personal identification number or the like of the print job, stored in the printing apparatus, which coincides with the readout ID information, thereby performing printing operation (see, for example, Japanese Patent Laid-Open No. 11-150559).

There is a risk that print data exchanged through a network will be monitored on the network and duplicated by a third party, and the third party will duplicate and obtain the contents of the print job without permission by transmitting the duplicated print data to another printing apparatus. There is also a risk that a third party will duplicate the data of a print job itself stored in the printing apparatus, and transmit the data to another printing apparatus, thus duplicating and obtaining the contents of the print job without permission.

In order to cope with such a problem, there has been proposed a system which encrypts print data exchanged through a network and print data stored in a printing apparatus (see, for example, Japanese Patent Laid-Open No. 09-134264).

In addition, recently, IC cards have increasingly become popular, and studies have been made on the use of an IC card instead of the above ID card which is used to simplify the operation of inputting a personal identification number or password. An improvement in the performance of IC cards allows the IC cards to perform the above encryption by themselves. This makes it basically impossible to perform decryption without an IC card which has been used for encryption. Therefore, stricter methods of protecting print data have been studied.

In a printing operation in which the confidentiality of print data is protected by using IC cards, in general, decryption can be performed only by an IC card which has been used for encryption, and hence printing processing cannot be started until the IC card is inserted into a printing apparatus in which encrypted print data is stored. Print data is written by a page description language and the like, and the printing apparatus prints after converting the print data expressed by the page description language and the like into image data. That is, the print data cannot be converted into image data until the user inserts an IC card into the printing apparatus. Therefore, it takes much time to convert print data written by a complex page description language into image data. That is, it takes much time to deliver printed matter after the user inserts an IC card.

The present invention has been made in consideration of the above problem, and has as its object to provide an image forming apparatus, image forming method, and the like which can speed up the processing from the decryption of data at the start of printing to the execution of printing while ensuring confidentiality on a network and the confidentiality of print, data in the image printing apparatus which processes the print data by encrypting the print data.

BRIEF SUMMARY OF THE INVENTION

In order to achieve the above object, an image forming apparatus and image forming method according to the present invention are mainly characterized by having the following arrangements.

According to the present invention, the foregoing object is attained by providing an image forming apparatus which receives encrypted data generated by an information processing apparatus, decrypts the encrypted data into data to be printed, and executes printing processing, comprising: acquisition means for acquiring print data by decrypting the received encrypted data; and encryption means for converting the acquired print data into image data for which the printing processing can be performed, and encrypting the image data using first key information.

In a preferred embodiment, the encryption means converts the print data acquired by the acquisition means into image data for which the printing processing can be performed, by encrypting the image data with second key information, and encrypting the second key information with the first key information.

BRIEF DESCRIPTION OF DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Preferred embodiments of the present invention will now be described in detail in accordance with the accompanying drawings.

First Embodiment

Figure 1:
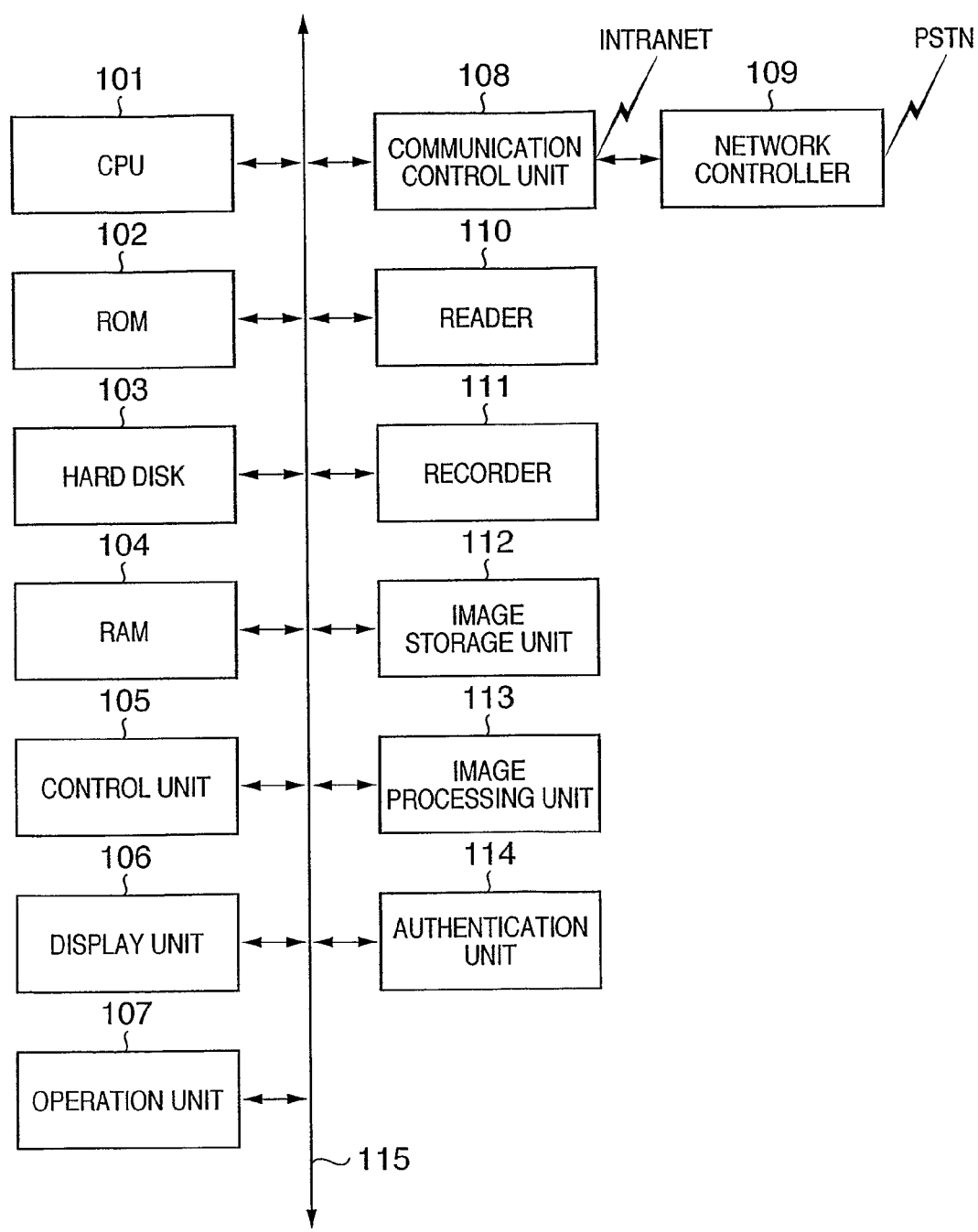
FIG. 1 is a block diagram showing the schematic arrangement of an image forming apparatus according to an embodiment of the present invention.

FIG. 1 is a block diagram showing a multifunction apparatus capable of performing image processing, image reading, and the like as an image forming apparatus according to the first embodiment of the present invention.

A control unit 105 executes various kinds of processing in the present invention together with various kinds of functions to be described later by using a RAM (Random Access Memory) 104 which stores various kinds of information such as driving conditions for the respective units of the apparatus and management data, together with data necessary for operation, in accordance with a control program read by a CPU (Central Processing Unit) 101 from a ROM (Read Only Memory) 102 or hard disk 103.

A display unit 106 displays various kinds of information such as driving conditions, the apparatus status, and input information associated with image data. An operation unit 107 includes operation input keys such as ten keys and a start key, which are used by a user to perform input operation such as making settings and issuing instructions, a touch panel displayed in the display unit 106, and the like.

A communication control unit 108 executes transmission/reception of document data including image data and control commands to/from an information processing apparatus which connects to an intranet or the Internet to function as a host computer. A network controller 109 connects to a PSTN (Public Switched Telephone Network) to perform line connection or disconnection by executing predetermined line control at the time of originating/terminating operation. The communication control unit 108 modulates/demodulates image data and control signals by a built-in modem device and executes facsimile transmission/reception through the network controller 109.

A reader 110 reads image data by photoelectrically converting reflected light corresponding to an image on an original to be transmitted, copied, or stored onto which light is applied. A recorder 111 forms read or received image data or received print data as a permanent visible image on a recording material (including a recording sheet, which will be simply referred to as a "recording sheet" hereinafter), and outputs the resultant recording sheet.

An image storage unit 112 temporarily stores image data contained in read or received print data or received print data. The image storage unit 112 may be set in the hard disk 103 depending on the arrangement of the image forming apparatus.

An image processing unit 113 performs the following operations in accordance with requests. The image processing unit 113 compresses and encodes image data to be transmitted, and decompresses and decodes received image data. The image processing unit 113 also converts received print data into image data, and converts image data to be stored into data in an appropriate format or a format designated by the user, e.g., the PDF format. In addition, the image processing unit 113 performs image correction processing in accordance with the optical response characteristics of the reader 110, variations in sensor output, and the like, image manipulation processing such as magnification processing for an image input by the user through the operation unit 107, image optimization processing for image data in accordance with the write characteristics of the recorder 111, and the like.

An authentication unit 114 performs print job authentication in addition to user authentication.

The components connected to a bus 115 include the CPU 101, ROM 102, hard disk 103, RAM 104, control unit 105, display unit 106, operation unit 107, communication control unit 108, reader 110, recorder 111, image storage unit 112, image processing unit 113, and authentication unit 114.

This image forming apparatus as a multifunction apparatus, therefore, has the transfer function of performing facsimile communication for transmitting read image data and transferring data to a document management server computer, the copying function of recording/outputting read image data, the reception print function of performing facsimile reception of a received image, and the print function of receiving and printing print data from a client computer. That is, this apparatus can be used as a facsimile apparatus, printer apparatus, and scanner apparatus as well as a copying machine.

The image forming apparatus has a user authentication function. According to this function, when, for example, a magnetic card in which the department number and password of the user are registered is inserted into a storage medium control unit (not shown), the image forming apparatus reads out a preset department number and password from the ROM 102 or hard disk 103, and causes the authentication unit 114 to perform authentication, thereby implementing the respective functions. In addition, in user authentication, the authentication unit 114 can authenticate on the basis of the department number and password input through the operation unit 107 without using any magnetic card.

Obviously, the gist of the present invention is not limited by any printing schemes, other than the electrophotographic printing scheme, e.g., the ink-jet scheme, thermal head scheme, and dot impact scheme, which the recorder 111 may use.

Figure 2:
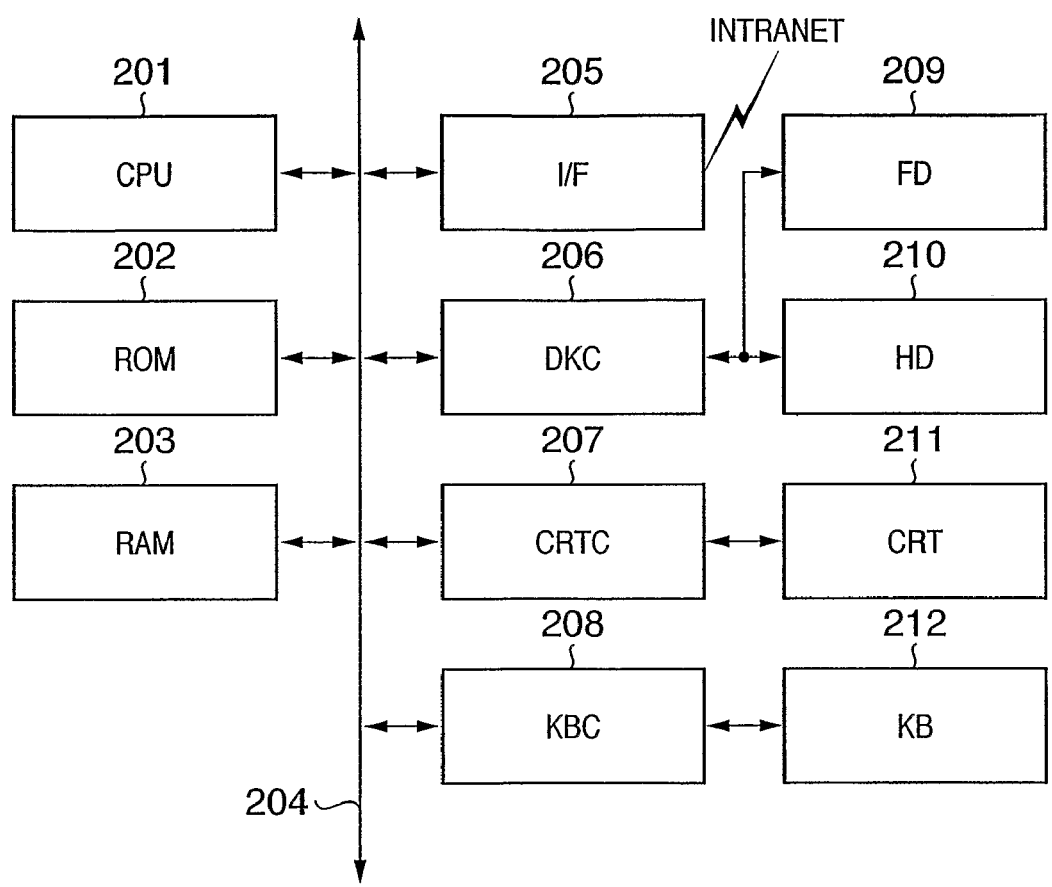
FIG. 2 is a block diagram showing the schematic arrangement of a client computer according to the embodiment of the present invention.

FIG. 2 is a block diagram showing the schematic arrangement of a printing client computer functioning as an information processing apparatus according to the first embodiment of the present invention. Referring to FIG. 2, the printing client computer includes a CPU (Central Processing Unit) 201 which executes a program stored in a ROM (Read Only Memory) 202 or hard disk (HD) 210 or supplied from a floppy disk drive (FD) 209, and systematically controls the respective devices connected to a system bus 204.

Reference numeral 203 denotes a RAM (Random Access Memory), which functions as the main memory, work area, and the like of the CPU 201.

Reference numeral 205 denotes a host interface (I/F), which allows two-way data communication with a local printer, a network printer, another network device, or another PC; 206, a disk controller (DKC), which controls access to the hard disk (HD) 210 and floppy disk (FD) 209 which store a boot program, various kinds of applications, edited files, user files, an install program generation program, and the like; 207, a CRT controller (CRTC), which controls the display of a CRT display (CRT) 211; and 208, a user command input controller (KBC), which controls instruction input operation from a keyboard (KB) 212, a pointing device (not shown), or the like.

Figure 3:
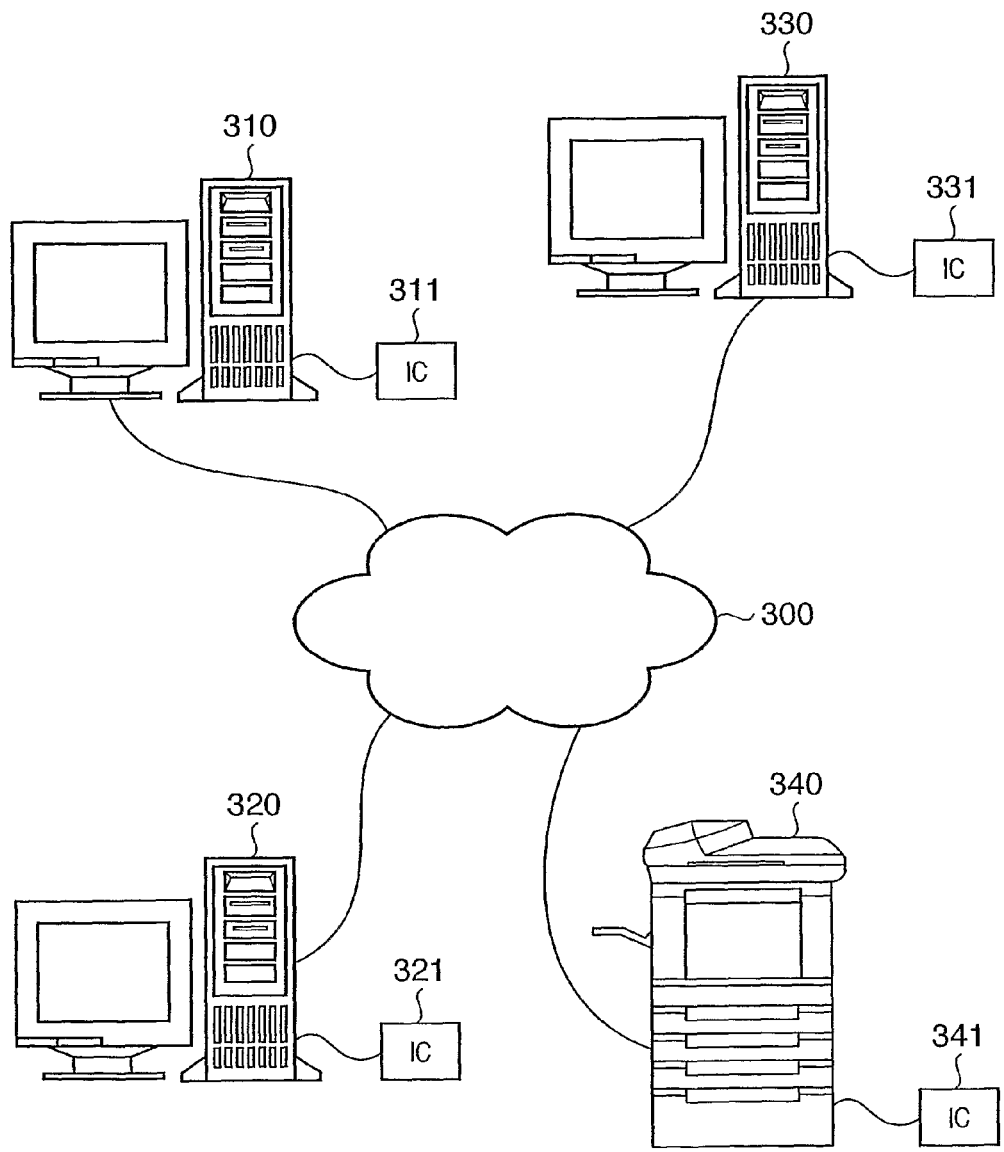
FIG. 3 is a view showing the arrangement of an image forming system on a network.

FIG. 3 is a view showing a general arrangement of the image forming system on a network according to the first embodiment of the present invention. Referring to FIG. 3, reference numeral 300 denotes a network, which supports, for example, the TCP/IP protocol; 310 and 320, client computers used by general users; 330, a management server computer; and 340, an image forming apparatus functioning as a multi-function apparatus, which has the arrangement shown in the block diagram of FIG. 1.

For example, electronic document data generated by the client computer 310 in accordance with an application is encrypted by using the ID information of a user who has input a print job or key information associated with encryption of, e.g., a common key, stored in an IC card connected to the client computer 310, and the encrypted data is transmitted to the image forming apparatus 340 through the network 300.

With regard to connection between an IC card and the client computer 310, for example, information of the IC card may be acquired from an IC card reader 311 or information stored in the IC card may be transmitted to the client computer 310 by radio.

Upon receiving an encrypted print job, the image forming apparatus 340 temporarily stores the data of the print job in the image storage unit 112 instead of immediately executing the print job. When the user walks to the image forming apparatus 340 and sets an IC card in an IC card reader 341, the image forming apparatus 340 decrypts the encrypted data of the print job stored in the image storage unit 112 and starts printing.

Obviously, the arrangement shown in FIG. 3 conceptually shows a general arrangement, and hence may include a plurality of client computers and a plurality of image forming apparatuses which users generally use. In addition, an apparatus which processes the data of a print job is not limited to an image forming apparatus functioning as a multifunction apparatus, and a single device such as a scanner, printer, or FAX may be connected to a network.

The information stored in an IC card can be read through an IC card reader 321 of another client computer 320 or an IC card reader 331 of the management server computer 330 and can be used for authentication processing and encryption.

<Processing by Client Computer>

Figure 4:
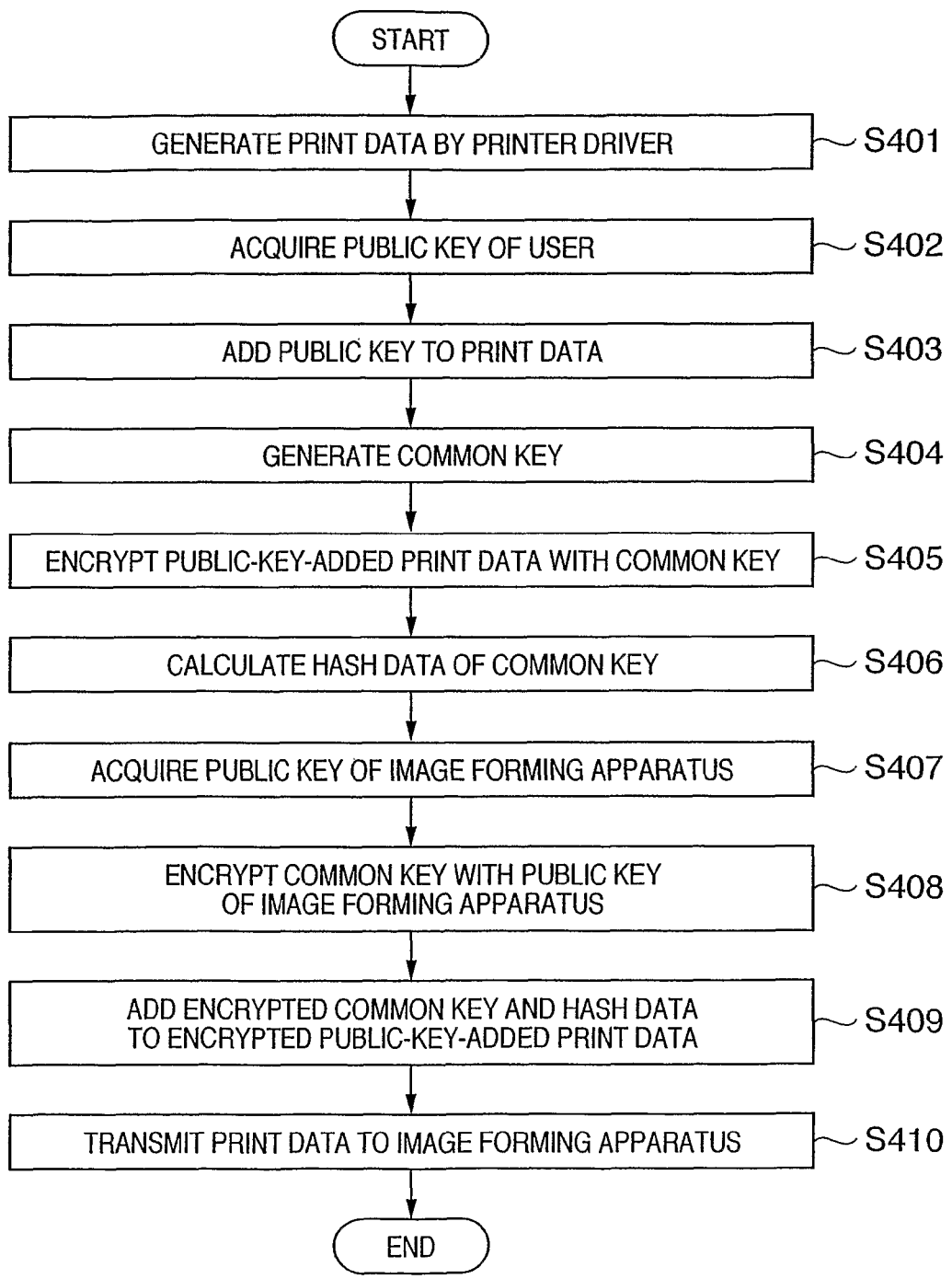
FIG. 4 is a flowchart for explaining the flow of processing in a client computer.

FIG. 4 is a flowchart for explaining the flow of processing in the client computer 310 according to an embodiment of the present invention.

First of all, in step S401, the printer driver generates print data on the client computer 310 under the control of the CPU 201 (assume that in this embodiment, the print data is formed from a page description language). In step S402, the client computer 310 acquires the public key of the user who has input the print job (to be referred to as a "user" hereinafter) under the control of the CPU 201. Various kinds of methods of acquiring the public keys of users are conceivable. However, since the form of logging in to a client computer with an IC card has recently become widespread, when an IC card reader/writer is connected to the client computer of the user, a method of directly acquiring a public key from an IC card may be used. In addition, there is conceivable a method in which a public key is stored in advance in a shared server or directory server and is acquired through a network. Furthermore, there are conceivable a method in which a public key is stored in advance in the HD 210 of a client computer and the public key of the user who has input the print job is acquired from the HD 210, a method in which a public key is stored in advance in a storage medium such as a DVD or flexible disk and is acquired through the storage medium, and the like.

In step S403, the CPU 201 executes the processing of adding the public key of the user, which is acquired in step S402, to the print data generated by the processing in step S401 (the data generated in this step will also referred to as "public-key-added print data").

In step S404, the CPU 201 generates a common key. Various methods of generating common keys are conceivable. For example, a random number may be generated and used as a common key.

In step S405, the CPU 201 encrypts the public-key-added print data of the user generated in step S403 by using the common key generated in step S404.

The flow processing advances to step S406 to calculate the hash data of the common key as data for checking whether or not decryption processing (to be described later) has been properly performed.

In step S407, the public key of the image forming apparatus which executes printing processing is acquired. Various methods of acquiring the public keys of image forming apparatuses are conceivable. For example, there is conceivable a method of directly acquiring a public key from an image forming apparatus through a network or storing in advance the public key of an image forming apparatus in a shared server or directory server and acquiring a public key from the server through a network. In addition, there are conceivable a method in which the public key of the image forming apparatus is stored in advance in the HD 210 of the client computer and is acquired from the HD 210 or a public key is stored in a storage medium such as a DVD or flexible disk and is acquired through the storage medium, and the like.

In step S408, the CPU 201 encrypts, by using the public key of the image forming apparatus acquired in step S407, the common key generated in the processing in step S404.

In step S409, the hash data generated in step S406 and the common key encrypted in step S408 are added to the print data (public-key-added print data) encrypted by the processing in step S405. In step S410, the data obtained by adding the hash data and encrypted common key to the public-key-added print data by the processing in step S409 is transmitted to the image forming apparatus through the interface (I/F) 205.

<Processing of Storing Image Data in Image Forming Apparatus>

Figure 5:
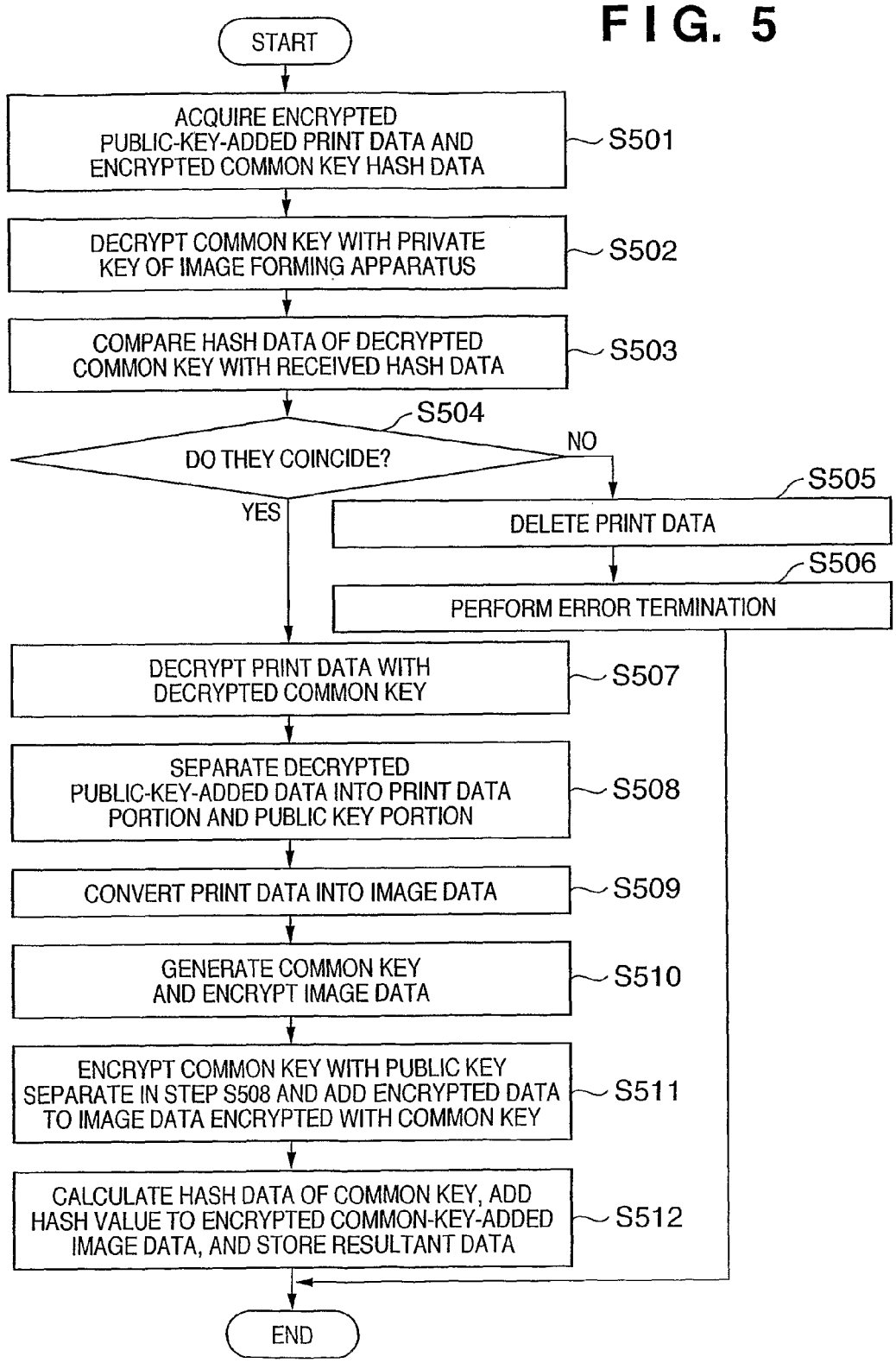
FIG. 5 is a flowchart for explaining the flow of image data storage processing in the image forming apparatus.

FIG. 5 is a flowchart for explaining the flow of storage processing for image data in the image forming apparatus 340 according to the embodiment of the present invention.

Note that before this flowchart is executed, the flowchart of FIG. 4 is executed by the client computer 310 (or 320 or 330) to transmit, to the image forming apparatus 340, the data obtained by adding hash data and an encrypted common key to public-key-added print data. Assume that at least one data obtained by adding the hash data and the encrypted common key to the public-key-added print data is stored in advance in the image storage unit 112 of the image forming apparatus 340.

In step S501, the data obtained by adding hash data and encrypted common key to public-key-added print data is acquired through the communication control unit 108 of the image forming apparatus 340.

In step S502, the encrypted common key acquired in step S501 is decrypted by the private key stored in the image forming apparatus 340 under the control of the CPU 101.

In steps S503 and S504, the decrypted hash data of the common key is compared with the hash data acquired in step S501 under the control of the CPU 101.

If the hash data of the decrypted common key differs from the hash data acquired in step S501 (NO in step S504), it indicates that decryption has failed due to the fact that the key pair for encryption/decryption in the image forming apparatus 340 differ from each other, print data is tampered or the like, and hence printing cannot be proceeded any more. The flow therefore advances to step S505 to delete the print data. In step S506, error termination is done.

If the decrypted hash data of the common key coincides with the hash data acquired in step S501 (YES in step S504), it indicates that decryption has been properly done. The flow therefore advances to step S507 to decrypt the public-key-added print data by using the decrypted common key.

In this embodiment, the data decrypted by the processing in step S507 comprises two portions, namely original print data made written by a page description language and the like and the public key of a user.

In step S508, the public-key-added print data decrypted by the processing in step S507 is separated into a print data portion and user public key portion under the control of the CPU 101.

In step S509, the print data portion cut in step S508 is converted into image data which can be printed by the image forming apparatus 340 under the control of the CPU 101.

The flow advances to step S510 to encrypt the image data converted in step S509. In general, the computation for encryption with a public key and decryption with a private key imposes a heavy load on the apparatus, and hence is not suitable for large-volume data such as entire image data. In this embodiment, therefore, a common key is generated, and image data is encrypted with the generated common key under the control of the CPU 101. In this case, various methods of generating common keys are conceivable. For example, a random number may be generated to be used as a common key.

Subsequently, in step S511, the common key generated in step S510 is encrypted with the user public key separated by the processing in step S508, and the resultant data is added to the image data encrypted with the common key in step S510 (the common key is encrypted with the public key of the user, and the image data is combined as data encrypted with the common key. This data will also be referred to as "encrypted common-key-added image data").

In step S512, the hash data of the common key generated in step S510 is calculated, the calculated hash data is added to the encrypted common-key-added image data generated in step S511, and the resultant data is stored in the image forming apparatus 340 under the control of the CPU 101. The processing is then terminated.

With the above processing, the image data is stored in the image forming apparatus 340 while being encrypted with the public key of the user under the control of the CPU 101.

<Printing Start Processing in Image Forming Apparatus>

Figure 6:
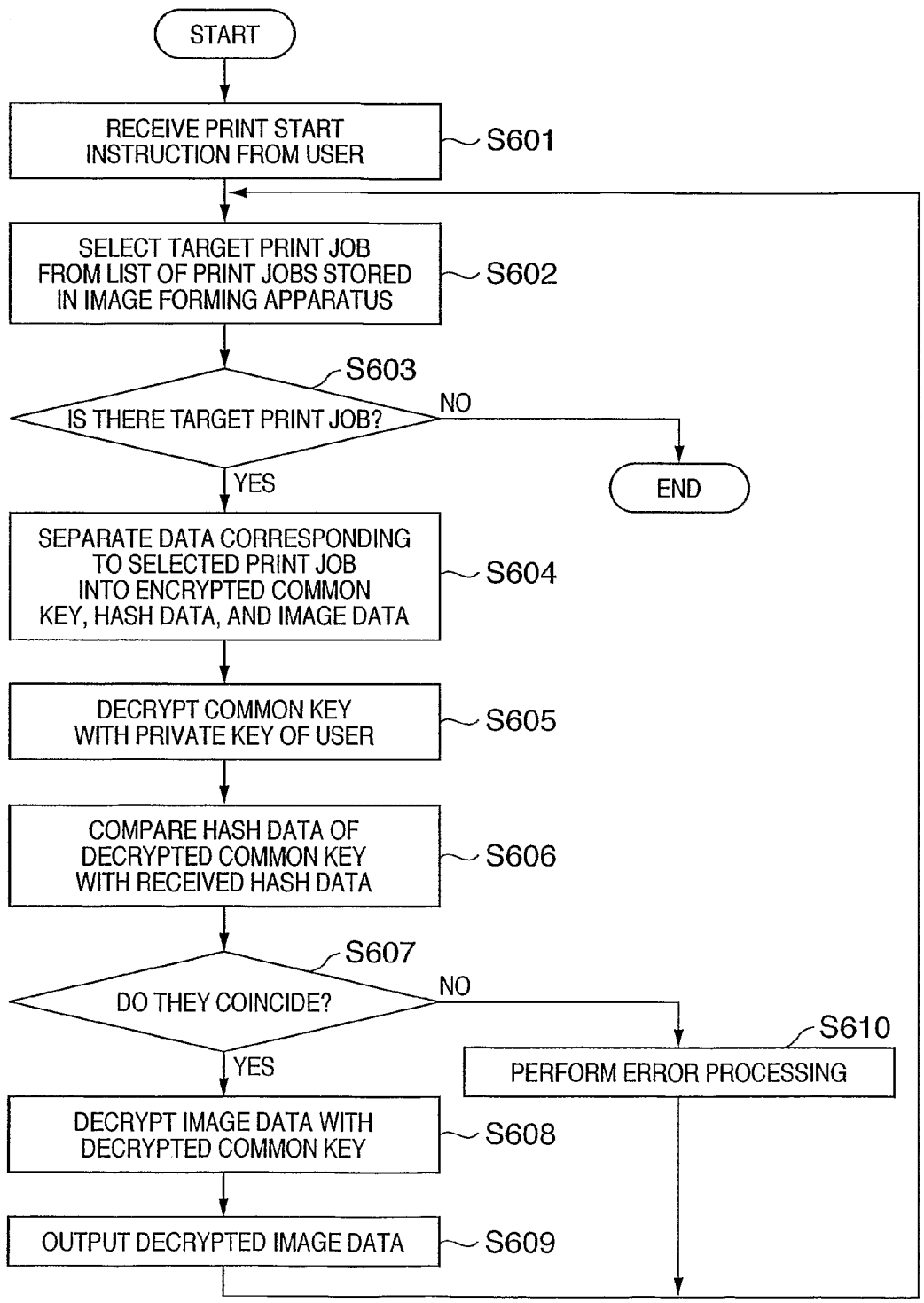
FIG. 6 is a flowchart for explaining the flow of a series of processing operations in which the image forming apparatus starts printing upon receiving a print instruction.

FIG. 6 is a flowchart for explaining a series of processing of starting printing upon reception of a print instruction in the image forming apparatus 340 according to the embodiment of the present invention.

In step S601, the image forming apparatus 340 receives a print start instruction from a user.

In step S602, the user selects a target print job from the list display of print jobs corresponding to common-key-added image data encrypted and stored in the image forming apparatus 340 by the series of processing shown in FIG. 5. For example, in issuing a print start instruction, the user may walk to the image forming apparatus, select a target print job from the print job list displayed on the display panel of the display unit 106, and press the print start button, or may insert the IC card of the user into an IC card reader/writer connected to the image forming apparatus.

In addition, as a method of selecting a target print job, a method of making the user select a target print job from the print job list displayed on the display panel may be used. In addition, the user may be made to input his/her unique ID such as a staff number when generating print data by using the client computer. The ID is added to the print data in advance, and a print job coinciding with the staff number input in front of the printing apparatus is selected, thereby automatically generating a print job list coinciding with the condition. Furthermore, when print data is to be generated by using the client computer, a unique ID may be acquired from an IC card. The ID is added to print data in advance so that a print job coinciding with the unique ID acquired from the IC card is selected upon insertion of the IC card into the image forming apparatus, thereby automatically generating a list. Alternatively, stored print jobs may be selected as target print jobs one by one.

In step S603, the CPU 101 determines whether or not there is a target print job. If there is a target print job (YES in step S603), the flow advances to step S604. If there is no target print job (NO in step S603), the processing is terminated.

In step S604, the CPU 101 separates data corresponding to the selected print job into an encrypted common key, hash data, and image data. In step S605, the CPU 101 decrypts the common key with the private key of the user. Note that when an IC card is to be used, confidentiality can be improved by performing decryption computation with the private key within the IC card inserted into the image forming apparatus, because the private key is not output from the IC card.

In step S606, the CPU 101 calculates the hash data of the decrypted common key. In step S607, the CPU 101 compares the calculated hash data with the hash data extracted in step S604. If the comparison result indicates that the two values differ from each other (NO in step S607), it indicates that decryption could not be performed properly due to the fact that decryption has been done with a wrong private key, data is tampered or the like. The flow therefore advances to step S610 to immediately perform error processing. The flow then returns to step S602.

If it is determined in step S607 that the values coincide with each other (YES in step S607), the flow advances to step S608 to decrypt the encrypted image data with the common key decrypted in step S605. In step S609, the decrypted image data is printed out. After the printout processing, the CPU 101 returns the flow of processing to step S602. Note that in this embodiment, the image data decrypted in step S608 is temporarily stored and held in the image storage unit 112 or RAM 104. Assume that the decrypted image data is erased after printout is completed. When the image storage unit 112 is formed from a hard disk, in particular, it is preferable to physically erase the image data by overwriting the area in which the image data is stored with NULL data or random data once or a plurality of number of times instead of logically erasing only a table (a so-called file allocation table: FAT) which manages the area in which the image data is stored.

With the above processing, since print data to be transmitted from the client computer to the image forming apparatus is encrypted, even if, for example, the print data is duplicated on a network path, the print data is meaningless unless decrypted, thus ensuring confidentiality.

In addition, since image data encrypted and stored in advance in the image forming apparatus is decrypted at the start of printing, confidentiality can be maintained, and the image data can be printed immediately after decryption. This makes it unnecessary to convert the print data formed from a page description language into image data after decryption, and hence makes it possible to speed up print processing.

That is, since received print data is temporarily decrypted and converted into image data and is encrypted again within the image processing apparatus, even if the encrypted image data stored in the image processing apparatus is duplicated without permission, the image data is meaningless unless decrypted. Therefore, confidentiality can be ensured.

In addition, since print data sent from a client computer is temporarily converted into image data instead of being stored without any processing, the printing processing from decryption to actual output operation can be speeded up.

Furthermore, encryption is performed with the public key of the user and decryption is performed with the private key of the user who has input the print job. If, therefore, for example, a private key is present in only an IC card, decryption cannot be done without the IC card of the user. This can further improve the confidentiality.

<First Modification>

As a method of encrypting print data when the print data is to be transmitted from a client computer to the image forming apparatus, the above description of the first embodiment has exemplified the method in which a common key is generated on the client computer side, the print data is encrypted with the common key, and the common key is further encrypted with the public key of the image forming apparatus. This is because it generally takes much processing time to perform public key encryption and private key decryption with respect to print data of a large data amount. However, print data may be directly encrypted with the public key of the image forming apparatus, and the gist of the present invention is not limited in this respect.

<Second Modification>

According to the above description of the first embodiment, when print data is to be transmitted from a client computer to the image forming apparatus, the print data is encrypted by using the public key of the image forming apparatus. However, the encryption technique to be used is not limited to this technique. Obviously, for example, an existing technique such as SSL (Secure Sockets Layer) or SSH (Secure Shell) can be used as an encryption technique on a network path.

<Third Modification>

As a method of encrypting image data stored in the image forming apparatus, the above description of the first embodiment has exemplified the method in which a common key is generated in the image forming apparatus, image data is encrypted with the common key, and the common key is further encrypted with the public key of the user who has input the print job. This is because it generally takes much processing time to perform public key encryption and private key decryption with respect to image data of a large data amount. However, image data may be directly encrypted with the public key of the user, and the gist of the present invention is not limited in this respect.

<Fourth Modification>

According to the first embodiment described above, the public key of the user who has input the print job is added to print data, and the resultant data is encrypted with a common key. However, for example, the following operation may be performed. A common key is stored in advance in an IC card, and the IC card is set in a client computer when printing is to be performed. The common key stored in the IC card is then extracted and added to the print data. When encrypting and storing image data, the image forming apparatus can encrypt the image data by using the common key transmitted which is added to the print data, instead of the public key of the user. Alternatively, upon receiving print data, the image processing apparatus may generate image data from the print data and encrypt the data with an added common key. If it is determined by comparison that the hash data of the decrypted common key coincides with the hash data sent from a client computer, the image data may be decrypted.

When the user sets an IC card in the image forming apparatus at the start of printing, a common key is extracted from the IC card under the overall control of the CPU 101, and the image data can be decrypted with the common key. Printing can then be started.

According to this embodiment, the confidentiality of print data on a network and in the image forming apparatus can be maintained, and decrypting converted image data at the time of storage makes it unnecessary to convert the print data into image data after decryption, thereby speeding up the printing processing.

Second Embodiment

The object of the present invention is realized even by supplying a storage medium storing software program codes for implementing the functions of the above-described embodiment to a system or apparatus, and causing the computer (or a CPU or MPU) of the system or apparatus to read out and execute the program codes stored in the storage medium. In this case, the storage of the program codes is not limited to a client computer, and the program codes may be stored in a computer functioning as, for example, a server.

In this case, the program codes read out from the storage medium implement the functions of the above-described embodiment by themselves, and the storage medium storing the program codes constitutes the present invention.

As a storage medium for supplying the program codes, a flexible disk, hard disk, optical disk, magnetooptical disk, CD-ROM, CD-R, DVD, magnetic tape, nonvolatile memory card, ROM, or the like can be used.

The functions of the above-described embodiment are implemented not only when the readout program codes are executed by the computer but also when the OS (Operating System) running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present, invention, the confidentiality of print data on a network and in the image forming apparatus can be maintained, and decrypting converted image data at the time of data storage makes it unnecessary to convert print data into image data after decryption. This makes it possible to speed up the printing processing.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-214615 filed on Jul. 22, 2004, which is hereby incorporated by reference herein.

The invention claimed is:

1. An image forming apparatus capable of communicating with an information processing apparatus, comprising:
   a reception unit adapted to receive from the information processing apparatus encrypted data formed by encrypting data including at least PDL (Page Description Language) data;
   a first decryption unit adapted to decrypt the encrypted data received by the reception unit and acquire decrypted PDL data which is included in the decrypted data;
   a conversion unit adapted to convert the decrypted PDL data by the decryption unit into raster image data,
   an encryption unit adapted to encrypt the raster image data converted by the conversion unit using first key information;
   a storage unit adapted to store the encrypted raster image data encrypted by the encryption unit at least until a user instruction for performing a printing processing is received;
   a second decryption unit adapted to decrypt the encrypted raster image data stored in the storage unit using the first key information;
   a printing unit adapted to print an image based on the raster image data decrypted by the second decryption unit; and
   a control unit adapted to perform processing operations before a user instruction for performing printing processing is received, thereby increasing the printing-response time once the user instruction is received, by,
      (A) without receiving the user instruction,
         (i) causing the first decryption unit to decrypt the encrypted data received by the reception unit,
         (ii) causing the conversion unit to convert the decrypted PDL data acquired by the first decryption unit into the raster image data, and
         (iii) causing the encryption unit to encrypt again the raster image data converted by the conversion unit, and
      (B) in accordance with receiving the user instruction,
         (iv) causing the second decryption unit to decrypt the encrypted raster image data stored in the storage unit, and
         (v) causing the printing unit to print the image based on the raster image data decrypted by the second decryption unit.

2. The apparatus according to claim 1, wherein the encrypted data received by the reception unit further includes the first key information; and
   the first decryption unit decrypts the encrypted data received by the reception unit and acquires the first key information from the decrypted data.

3. The apparatus according to claim 1, wherein the first key information includes information for identifying a user who generated the PDL data.

4. The apparatus according to claim 1,
   wherein the encrypted data received by the reception unit further includes second key information,
   the first decryption unit decrypts the encrypted data received by the reception unit and acquires the second key information from the decrypted data, and
   the first key information is encrypted using the second key information acquired by the decryption unit.

5. An image forming method executed in an image forming apparatus capable of communicating with an information processing apparatus, said method comprising:
   a reception step of receiving from the information processing apparatus encrypted data formed by encrypting data including at least PDL (Page Description Language) data;
   a first decryption step of decrypting the encrypted data received in the reception step and acquiring decrypted PDL data which is included in the decrypted data;
   a conversion step of converting the PDL data decrypted in the decryption step into raster image data;
   an encryption step of encrypting the raster image data converted in the conversion step using first key information;
   a storage step of storing the encrypted raster image data encrypted in the encryption step at least until a user instruction for performing a printing processing is received;
   a second decryption step of decrypting the encrypted raster image data stored in the storage step using the first key information;
   a printing step of printing an image based on the raster image data decrypted by the second decryption step; and
   a control step of performing processing operations before a user instruction for performing printing processing is received, thereby increasing the printing-response time once the user instruction is received, by,
      (A) without receiving the user instruction,
         (i) causing the first decryption step to decrypt the encrypted data received by the reception step,
         (ii) causing the conversion step to convert the decrypted PDL data acquired by the first decryption step into the raster image data, and
         (iii) causing the encryption step to encrypt again the raster image data converted by the conversion step, and
      (B) in accordance with receiving the user instruction,
         (iv) causing the second decryption step to decrypt the encrypted raster image data stored in the storage step, and
         (v) causing the printing step to print the image based on the raster image data decrypted by the second decryption step.

6. A non-transitory computer-readable storage medium storing an image forming program which causes a computer to execute an image forming method of an image forming apparatus capable of communicating with an information processing apparatus, said method comprising:

a reception step of receiving from the information processing apparatus encrypted data formed by encrypting data including at least PDL (Page Description Language) data;

a first decryption step of decrypting the encrypted data received in the reception step and acquiring decrypted PDL data which is included in the decrypted data;

a conversion step of converting the PDL data decrypted in the decryption step into raster image data;

an encryption step of encrypting the raster image data converted in the conversion step using first key information;

a storage step of storing the encrypted raster image data encrypted in the encryption step at least until a user instruction for performing a printing processing is received;

a second decryption step of decrypting the encrypted raster image data stored in the storage step using the first key information;

a printing step of printing an image based on the raster image data decrypted by the second decryption step; and a control step of performing processing operations before a user instruction for performing printing processing is received, thereby increasing the printing-response time once the user instruction is received, by, (A) without receiving the user instruction,
  (i) causing the first decryption step to decrypt the encrypted data received by the reception step,
  (ii) causing the conversion step to convert the decrypted PDL data acquired by the first decryption step into the raster image data, and
  (iii) causing the encryption step to encrypt again the raster image data converted by the conversion step, and (B) in accordance with receiving the user instruction,
  (iv) causing the second decryption step to decrypt the encrypted raster image data stored in the storage step, and
  (v) causing the printing step to print the image based on the raster image data decrypted by the second decryption step.

* * * * *